United States Patent [19]

Grootaert et al.

[11] Patent Number: 4,882,390
[45] Date of Patent: Nov. 21, 1989

[54] FLUOROELASTOMER COMPOSITION WITH ORGANO-ONIUM COMPOUNDS

[75] Inventor: Werner M.A. Grootaert; Robert E. Kolb, both of St. Paul, Minn.

[73] Assignee: Minnesota Mining and Manufacturing Company, St. Paul, Minn.

[21] Appl. No.: 311,135

[22] Filed: Feb. 15, 1989

Related U.S. Application Data

[63] Continuation-in-part of Ser. No. 176,410, Apr. 1, 1988, abandoned.

[51] Int. Cl.$^4$ ............................................. C08F 8/00
[52] U.S. Cl. ............................... 525/326.3; 525/340; 525/343; 525/379
[58] Field of Search ................. 525/326.3, 340, 341, 525/343, 348, 353, 360, 375, 379

[56] References Cited

U.S. PATENT DOCUMENTS

| | | | |
|---|---|---|---|
| 2,703,814 | 3/1955 | Dye | 564/12 |
| 2,807,648 | 9/1957 | Pitt | 568/75 |
| 3,655,727 | 4/1972 | Patel et al. | |
| 3,686,143 | 8/1972 | Bowman | |
| 3,712,877 | 1/1973 | Patel et al. | 525/340 |
| 3,752,787 | 8/1973 | Brunner | |
| 3,857,807 | 12/1974 | Kometani et al. | |
| 3,859,259 | 1/1975 | Harrell et al. | 525/326.3 |
| 3,876,654 | 4/1975 | Pattison | |
| 3,892,641 | 7/1975 | Tabata et al. | |
| 3,933,732 | 1/1976 | Schmiegel | |
| 4,120,866 | 10/1978 | Winkler | 548/440 |
| 4,148,982 | 4/1979 | Morozumi et al. | 526/58 |
| 4,233,421 | 11/1980 | Worm | 525/343 |
| 4,259,463 | 3/1981 | Moggi et al. | 525/331 |
| 4,277,586 | 7/1981 | Ukihashi et al. | 526/93 |
| 4,287,320 | 9/1981 | Kolb | 525/340 |
| 4,358,559 | 11/1982 | Holcomb et al. | 524/380 |
| 4,446,270 | 5/1984 | Guenthner et al. | 525/433 |
| 4,645,799 | 2/1987 | Wachi et al. | 525/199 |
| 4,742,126 | 5/1988 | Moggi | 525/340 |

OTHER PUBLICATIONS

W. W. Schmiegel "Crosslinking of Vinylidene Fluoride/Herafluoropropylene Fluoroelastomer by Bisphenols", *Kautschuk & Gummi Kunststoffe*, 31/3, (1978), pp. 137–148, Original Article and English Language Translation Included.

W. W. Schmiegel, *Die Angewandte Makromolekulare Chemie*, "Crosslinking of Elastomeric Vinylidene Fluoride with Nucleophiles", 76/77, (1979), pp. 39–65.

West, A. C. and Holcomb, A. G., "Fluorinated Elastomers", *Kirk—Othmer; Encyclopedia of Chemical Technology*, 8, 3rd., #d., John Wiley & Sons, pp. 500–515, (1979).

*Basic Principles of Organic Chemistry*, Roberts and Caserio, W. A. Benhamin Company, N.Y., N.Y., 1965, 00, 755–760.

*Organic Synthesis*, 1, pp. 718–725, vol. II, pp. 1709–1715, Reinhold Publishing Co., N.Y., N.Y., (1957).

G. H. Wiegard, et al., "Synthesis and Reactions of Triarylsulfonium Halides", *J. Org. Chem.*, 33, 2671–2675, (1968).

K. Ohkubo et al., *J. Org. Chem.*, 36, 3149–3155, (1971).

*Primary Examiner*—Christopher Henderson
*Attorney, Agent, or Firm*—Donald M. Sell; Walter N. Kirn; William G. Ewert

[57] ABSTRACT

A fluoroelastomer composition curable in reactive admixture with an acid acceptor that includes an elastomeric gum consisting essentially of vinylidene fluoride, tetrafluoroethylene, and copolymerizable hydrocarbon olefin and a combination of (A) polyhydroxy compound, and
(B) organo-onium compound, and process of curing the elastomeric copolymer with an admixture of (A) and (B) and an acid acceptor, and the resulting shaped or formed, cured articles are described.

29 Claims, No Drawings

FLUOROELASTOMER COMPOSITION WITH ORGANO-ONIUM COMPOUNDS

This is a continuation-in-part of Application Ser. No. 176,410 filed Apr. 1, 1988 now abandoned.

This invention relates to fluoroelastomer compositions comprising an elastomeric copolymer of tetrafluoroethylene, vinylidene fluoride, and one or more hydrocarbon olefins and curing agent. In another aspect, it relates to a process for curing the shaped or formed articles of such fluoroelastomer composition and the resulting shaped or formed, cured articles.

Various vinylidene fluoride, tetrafluoroethylene and propylene copolymers and a number of curing systems therefor, have been described in the art. However, for some of such copolymers the curing systems containing polyhydroxy and organo-onium compounds have been described as inferior for these copolymers, e.g. see European Pat. Application No. 218929 A2 (Yasumichi et al.). In a comparative example, Yasumichi et al. describe the cure properties of one such copolymer with benzyltriphenylphosphonium chloride and bisphenol AF as a poor cure and not suitable for practical application. Consistent with this finding, various alternative cure systems for these copolymers have been proposed; for example, U.S. Pat. No. 3,859,259 (Harrell) discloses the use of diamines and diamine carbamates as crosslinking agents and a compound able to accelerate the crosslinking reaction selected from the group: quaternary ammonium compounds, quaternary phosphonium compounds, penta-substituted guanidines and salts thereof, tri-substituted amidines, cyclic polyethers and open-chain polyethers. And Jap. Kokai Pat. Application No. Sho 52[1977]-41662 discloses the use of a peroxy compound as the crosslinking agent and a crosslinking promoter.

Ethylenically unsaturated copolymers derived from vinylidene fluoride, tetrafluoroethylene, and propylene by treatment with an aqueous alkaline solution containing an onium compound to introduce ethylenic unsaturation before curing have been proposed, e.g. see U.S. Pat. No. 4,645,799 (Wachi et al.) and said European Pat. Application No. 218929 A2 (Yasumichi et al.). Wachi et al. disclose the use of an organic peroxide and a vulcanization accelerator, e.g. allyl compounds, as the curing system. Yasumichi et al. disclose the use of a polyhydroxy compound and a vulcanization accelerator, e.g. a quaternary ammonium compound, as the curing system.

Yasumichi et al.'s finding of poor cure for said comparative example is not inconsistent with W. W. Schmiegel's studies indicating the importance of the presence of hexafluoropropylene monomers in achieving a useful state of cure when crosslinking with nucleophilic crosslinking agents, see W. W. Schmiegel, "Cross-linking of Vinylidene Fluoride/Hexafluoropropylene Fluoroelastomer by Bisphenols," *Kautschuk+Gummi Kunststoffe*, 31/3 (1978), pp. 137-148, and W. W. Schmiegel, *Die Angewandte Makromolekulare Chemie*, "Crosslinking of Elastomeric Vinylidene Fluoride Copolymers with Nucleophiles", 76/77 (1979), pp. 39-65. Schmiegel concludes that vinylidene fluoride copolymers that do not contain hexafluoropropylene are less sensitive to attack by nucleophiles, such as bisphenol compounds, than copolymers containing hexafluoropropylene. However, Jap. Kokoku Pat. Nos. Sho 60[1985]-19324 (Hisasue et al.) and Sho 60[1985]-19325 (Hisasu® et al.) state that copolymers comprising 30 to 90 mole percent vinylidene fluoride, 5 to 50 mole percent ethylene tetrafluoride (sic. tetrafluoroethylene), and 5 to 40 mole percent propylene and those comprising 10 to 30 mole percent vinylidene fluoride, 25 to 50 mole percent ethylene tetrafluoride (sic. tetrafluoroethylene) and 25 to 45 mole percent propylene can be crosslinked using various techniques including inter alia nucleophilic agents (e.g., hydroquinone, catechol, Bisphenol A) either alone or in combination with polyethers. However, neither patent discloses by working example or otherwise that such nucleophilic reagents were ever in fact used to cure the copolymer and such disclosure appears inconsistent with Yasumichi et al. and Schmiegel's teachings.

Cure systems for tetrafluoroethylene and propylene copolymers have also been described, e.g., U.S. Pat. Nos. 3,892,641 (Tabata et al.), 4,277,586 (Ukihashi et al.), describe high energy ionizing radiation and peroxy cure systems and U.S. Pat. No. 4,148,982 (Morozumi et al.) mention the use of polyhydroxy aromatic compounds for vulcanization of the copolymer only after thermal modification of the copolymer.

This invention provides a elastomeric composition comprising saturated elastomer gum consisting or consisting essentially of interpolymerized units derived from vinylidene fluoride, tetrafluoroethylene, and copolymerizable hydrocarbon olefin, e.g. propylene, and the combination of (A) polyhydroxy compound, and (B) organo-onium compound, such as those selected from the group consisting of ammonium, arsonium, phosphonium, stibonium, amino-phosphonium, phosphorane (e.g., triarylphosphorane), iminium, and sulfonium compounds.

However, if said gum is derived from vinylidene fluoride, tetrafluorethylene, and olefin, such as propylene, and said polyhydroxy compound is bisphenol AF (i.e., hexafluoroisopropylidene-bis (4-hydroxybenzene)) and said organo-onium compound is a phosphonium compound, it is other than benzyltriphenylphosphonium chloride.

In order to cure the elastomeric composition, said composition can be admixed with acid acceptor, e.g. a conventional acid acceptor like calcium hydroxide, to render the composition curable. The invention also provides a process of curing shaped or formed articles, e.g. O-rings, which process comprises providing a mixture of the gum, component A (the polyhydroxy compound), and oomponent B (the organo-onium compound), and acid acceptor, and shaping and curing the resulting mixture. Preferred compositions additionally include one or more diorgano sulfur oxide compounds. The invention further provides shaped or formed articles comprising said cured copolymers.

The novel cure system of this invention provides surprisingly useful state of cure and synergistic cure rates for vinylidene fluoride, tetrafluoroethylene, and hydrocarbon olefin copolymers using a cure system of polyhydroxy and organo-onium compounds without requiring hexafluoropropylene comonomers or pre-treatments, such as those described in the art cited above.

The copolymers used in this invention are saturated (i.e. essentially free of unsaturation), fluorine-containing, elastomeric gums consisting or consisting essentially of interpolymerized units derived from vinylidene fluoride, tetrafluoroethylene and one or more, preferably one or two, copolymerizable hydrocarbon olefin monomers. The olefin monomers can be represented, for example, by those having the formula $R^1 R^1 C=CR^1 R^1$ wherein $R^1$ groups can be the same or different and can be selected from hydrogen, alkenyl, and alkyl, can be straight chain or branched, with preferably one to three carbon atoms. Representative examples of olefin monomers are ethylene, propylene, isobutylene, butene-1, butene-2, and 1,3-butadiene. The molar ratios of said monomers used in making the copolymer will be selected to achieve the physical properties (e.g., chemical resistance, high temperature stability, low temperature flexibility, and fuel resistance) desired in the cured polymer. The selection of such ratios will be within the skill of the art, based on the known relationships between the relative amounts of particular monomers and the physical properties of the copolymer. Generally, however, the copolymers to be used in this invention are those comprising about 2 to 90 mole percent vinylidene fluoride, 5 to 65 mole percent tetrafluoroethylene, and 5 to 45 mole percent hydrocarbon olefin. A particularly useful class of copolymers are those comprising about 2 to 65 mole percent of vinylidene fluoride, 20–60 mole percent of tetrafluoroethylene, and 10–50 mole percent hydrocarbon olefin. Preferably, the hydrocarbon olefin is propylene. The copolymers of this invention are inclusive of those known in the art and can be prepared by known techniques such as those described in U.S. Pat. No. 3,859,259, Jap. Pat. No. Sho 60[1985]-19324, Jap. Pat. No. Sho 60[1985]-19325.

The polyhydroxy compound which is admixed with the copolymer is one capable of functioning as a crosslinking agent for the copolymer. Such agents are well-known and are described in the art, e.g., U.S. Pat. Nos. 4,259,463 (Moggi et al.), 3,876,654 (Pattison), and 4,233,421 (Worm), and can include aromatic polyhydroxy compounds and aliphatic polyhydroxy compounds, and the derivatives of said compounds. Also, blends of polyhydroxy compounds may be used in this invention.

Representative aromatic, polyhydroxy compounds include the following: di-, tri-, and tetrahydroxy-benzenes, naphthalenes, and anthracenes, and bisphenols of the formula

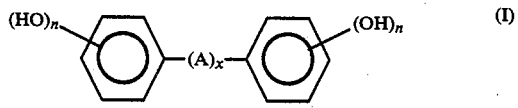 (I)

wherein A is a divalent aliphatic, cycloaliphatic, or aromatic radical of 1 to 13 carbon atoms, or a thio, oxy, carbonyl, sulfinyl, or sulfonyl radical; A is optionally substituted with one or more chlorine or fluorine atoms; x is 0 or 1; n is 1 or 2; and any aromatic ring of the polyhydroxyl compound can be optionally substituted with at least one atom of chlorine, fluorine, or bromine, or carboxyl, or an alkyl, or an acyl (e.g., a —COR where R is a $C_1$ to $C_8$ alkyl, aryl, or cycloalkyl group) radical. It will be understood from the above bisphenol formula that the —OH groups can be attached in any position (other than number one, i.e., the carbon atoms where the A group is attached to the rings) in either ring. Specific aromatic polyhydroxy compounds include 4,4'-thiodiphenol, isopropylidene-bis(4-hydroxybenzene) (i.e. bisphenol A), hexafluoroisopropylidene-bis(4-hydroxybenzene), (i.e. bisphenol AF) and are described or illustrated in U.S. Pat. No. 4,233,421 (Worm) all of which teachings are incorporated herein by reference.

Representative aliphatic polyhydroxy compounds include fluoroaliphatic diols, e.g. 1,1,6,6-tetrahydrooctafluorohexanediol, and others such as those described in U.S. Pat. No. 4,358,559 (Holcomb et al.) and references cited therein. Representative polyhydroxy derivatives of polyhydroxy compounds which can be used as crosslinking agents are described in U.S. Pat. No. 4,446,270 (Guenthner et al ), and include, for example, 2-(4-allyloxyphenyl)-2-(4-hydroxyphenyl) propane.

Preferred polyhydroxy compounds are aromatic polyhydroxy compounds having formula (I) such as bisphenol A and bisphenol AF. A blend of two or more of the polyhydroxy compounds can be used in this invention. When changing from one polyhydroxy compound to another in a given composition, one skilled in the art will be able to select a curing time and temperature that will give a suitable rate of cure for a particular application.

The organo-onium compound which is admixed with the copolymer is capable of functioning as a vulcanization accelerator. As is known, an organo-onium compound is the conjugated acid of a Lewis base (e.g., phosphine, amine, ether, or sulfide) and can be formed by reacting said Lewis base with a suitable alkylating agent (e.g., an alkyl halide or acyl halide) resulting in the expansion of the valence of the electron donating atom of the Lewis base and a positive charge on the organo-onium compound. Many of the organo-onium compounds useful in this invention contain at least one heteroatom, i.e., a non-carbon atom such as N, P, S, O, bonded to organic or inorganic moieties. The organo-onium compounds suitable for use in this invention are known and are described in the art. See, for example, U.S. Pat. Nos. 3,655,727 (Patel et al.), 3,712,877 (Patel et al.), 3,857,807 (Kometani), 3,686,143 (Bowman), 3,933,732 (Schmiegel), 3,876,654 (Pattison), 4,233,421 (Worm), and 4,259,463 (Moggi et al.), European Patent Application No. 0182299A2 and European Patent Application No. 0120462A1; and also see West, A. C. and Holcomb, A. G. "Fluorinated Elastomers", Kirk-Othmer; Encyclopedia of Chemical Technology, Vol. 8, 3rd Ed., John Wiley & Sons, Inc., pp. 500–515 (1979). Mixtures of organo-onium compounds are also useful in this invention. Said organo-onium compounds include quaternary organo-onium compounds, such as those selected from the group consisting of ammonium, arsonium, phosphonium, stibonium, amino-phosphonium, phosphorane (e.g., triarylphosphorane), and iminium compounds, and sulfonium compounds. One class of quaternary organo-onium compounds are organic compounds ionically associated with an anion, wherein at least one nitrogen, phosphorus, arsenic or antimony atom is covalently bonded to four organic moieties. In another class of quaternary organo-onium compounds the nitrogen, phosphorus, arsenic or antimony atom may be a heteroatom in a cyclic structure, e.g., 8-benzyl-,1,8-diazobicyclo[5,4,0]-7-undecenium chloride. One class of quaternary organo-onium compounds herein broadly comprises relatively positive and relatively negative ions (the phosphorus, arsenic, antimony or nitrogen atom generally comprising the central atom of the positive ion), these compounds being generally known as ammonium, phosphonium, arsonium, or stibonium salts or compounds preferably having the general formula:

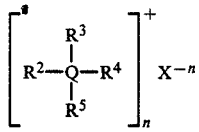

where Q is selected from the group consisting of nitrogen, phosphorous, arsenic, and antimony; X is an organic or inorganic anion (e.g. halide, sulfate, acetate, phosphate, phosphonate, hydroxide, alkoxide, phenoxide, bisphenoxide, etc.); n is equal to the valence of the anion X; and $R^2$, $R^3$, $R^4$, and $R^5$ are selected from the group of radicals consisting of alkyl, aryl, alkenyl, or combinations thereof. $R^2$, $R^3$, $R^4$ and $R^5$ can be substituted with chlorine, fluorine, bromine, cyano, —OR, and —COOR moieties where R is selected from the group consisting of $C_1$ to $C_{20}$ alkyl, aryl, aralkyl, and alkenyl. Any pair of said R groups can be connected with each other and the Q atom to form a heterocyclic ring. However, compositions wherein said copolymer is derived from vinylidene fluoride, tetrafluoroethylene and olefin, propylene monomer, and the polyhydroxy compound is bisphenol AF, Q is phosphorous, X is a chloride anion, n is 1, three of the groups, $R^2$, $R^3$, $R^4$, and $R^5$ are phenyl moieties, the remaining R group cannot be a benzyl moiety. A preferred class of quaternary organo-onium compounds has the general formula (II) and at least one of the groups $R^2$, $R^3$, $R^4$ or $R^5$ is alkyl, or alkenyl. Representative of this preferred class are tetrabutylammonium chloride, tetrabutylammonium bromide, tetrahexylammonium chloride, tetraheptylammonium chloride, tetrapentylammonium chloride, tributylallylphosphonium chloride, tributylbenzylphosphonium chloride, dibutyldiphenylphosphonium chloride, tetrabutylphosphonium chloride and tributyl(2-methoxy)propylphosphonium chloride compounds.

Said tributyl(2-methoxy)propylphosphonium chloride is believed to be novel.

Another class of quaternary organo-onium compounds useful in this invention are amino-phosphonium compounds some of which are described in the art, see for example, U.S. Pat. No. 4,259,463 (Moggi et al.). The amino-phosphonium compounds can be of the ionic type described by Moggi et al. and can have the general formulas

or

Where $R^6$, $R^7$, and $R^8$ can be the same or different, and may be selected from the group consisting of alkyl, cycloalkyl, aryl, aralkyl, oxyalkyl or poly(oxyalkyl) groups with a free or etherified terminal OH function, may contain from 1 to 18, but preferably from 1 to 12 carbon atoms and may contain, as substituents, halogens CN, OH, carboalkoxy groups; moreover, $R^6$ and $R^7$ may be connected with each other to form with the nitrogen atom a heterocyclic ring. $R^9$ is a bivalent alkylene, arylene or oxoalkylene radical, n is a whole number beween 1 and 4, r is a whole number between 1 and 3, m is a whole number between 1 and 3 and corresponds to the valence of anion Y, p is a coefficient, such that m times p is 2. Y is an anion of valency m and may be either organic or inorganic. Examples of such anions are halide, perchlorate, nitrate, tetrafluoroborate, hexafluorophosphate, oxalate, acetate, stearate, haloacetate, para-toluensulphonate, phenoxide and bisphenoxide and hydroxy anions. Y may also be a complex anion such as $ZnCl_4^{-2}$, $CdCl_4^{-2}$, $NiBr_4^{-2}$, $HgI_3^{-1}$. A particularly preferred amino-phosphonium accelerator is benzyltris(dimethylamino)phosphonium chloride.

Another class of quaternary organo-onium compounds useful in this invention are phosphorane compounds such as triarylphosphorane compounds; some of the latter compounds are known and are described in the art, see for example, U.S. Pat. No. 3,752,787 (de Brunner), which descriptions are herein incorporated by reference. Some of the triarylphosphorane compounds useful in this invention have the general formula

wherein Ar is aryl, selected for example, from phenyl, substituted phenyl, e.g. methoxyphenyl, chlorophenyl, tolyl, and other known groups, e.g. naphthyl. $R^{10}$ and $R^{11}$ are selected from the group consisting of (1) separate groups selected individually from (a) hydrogen, methyl, ethyl, propyl, and carbalkoxy ($C_1$–$C_6$ alkyl) in the case of $R^{10}$, and (b) carbalkoxy ($C_1$–$C_6$ alkyl) cyano, and —$CONH_2$ in the case of $R^{11}$; and (2) a single group which together with the carbon atom to which the single group is attached form a cyclic group selected from

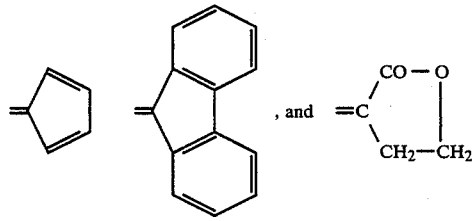

Another class of quaternary organo-onium compounds useful in this invention are iminium compounds. Some of the iminium compounds useful in this invention are organic compounds having the general formula

wherein $R^{12}$ is a monovalent organic radical terminated with a non-carbon atom such as P, S, O, or N, such that said organic radical is covalently bonded to the nitrogen atom through said non-carbon atom, c is the valence of the anion X, e.g., 1 or 2, and X is an organic or inorganic anion, e.g., halide, hydroxy, sulfate, thiosulfate, nitrate, formate, acetate, cyanate, thiocyanate, tetraphenylborate, 2-mercaptobenzothiazolate, phosphate, phosphonate, alkoxide, phenoxide, bisphenoxide or perchlorate ions. The positive charge of the cation can be assigned to the N atom, but it can also equally be distributed to the two non-carbon atoms.

Another class iminium compounds useful in this invention are known and described in the art, e.g., European Patent Applications 182299A2 and 120462A1 which descriptions are herein incorporated by reference. Some of said iminium compounds have the general formula

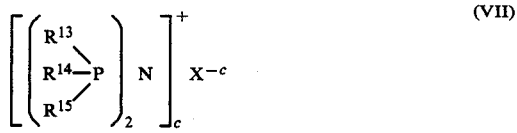

wherein $R^{13}$, $R^{14}$ and $R^{15}$ can be the same or different and can be selected from the group consisting of aryl, $C_1$ to $C_{20}$ alkyl, $C_3$ to $C_8$ cycloalkyl, $C_7$ to $C_{20}$ aralkyl groups. Said aryl or aralkyl groups can, optionally, be substituted with one or more groups selected from the group consisting of $C_1$ to $C_{20}$ alkyl groups, $C_3$ to $C_8$ cyclo-alkyl groups, halogen atoms and groups having the formula

where $R^{16}$ and $R^{17}$ are the same or different and are selected from the group consisting of $C_1$ to $C_{20}$ alkyl, a $C_3$ to $C_8$ atom cycloalkyl and phenyl groups. X is an anion such as those described above and c is the valence of X.

Representative quaternary organo-onium compounds include phenyltrimethylammonium chloride, tetrapentylammonium chloride, tetrapropylammonium bromide, tetrahexylammonium chloride, tetraheptylammonium bromide, tetramethylphosphonium chloride, tetramethylammonium chloride, tetrabutylphosphonium chloride, tributylbenzyl phosphonium chloride, tetrabutylammonium chloride, tetrabutylammonium bromide, tributylallylphosphonium chloride, tetraphenylphosphonium chloride, tetraphenylarsonium chloride, tetraphenylstibonium chloride, 8-benzyl-1,8-diazobicyclo[5.4.0]7-undecenium chloride, benzyltris(dimethylamino)phosphonium chloride, and bis(benzyldiphenylphosphine)iminium chloride.

Sulfonium compounds useful in this invention are known and described in the art, e.g., see U.S. Pat. No. 4,233,421 (Worm). Briefly described, a sulfonium compound is a sulfur-containing organic compound in which at least one sulfur atom is covalently bonded to three organic moieties having from 1 to 20 carbon atoms by means of carbon-sulfur covalent bonds and is ionically associated with an anion. Said organic moieties can be the same or different. The sulfonium compounds may have more than one relatively positive sulfur atom, e.g. $[(C_6H_5)_2S^+(CH_2)_4S^+(C_6H_5)_2]2Cl^-$, and two of the carbon-sulfur covalent bonds may be between the carbon atoms of a divalent organic moiety, i.e., the sulfur atom may be a heteroatom in a cyclic structure.

A preferred class of sulfonium compounds are salts having the formula

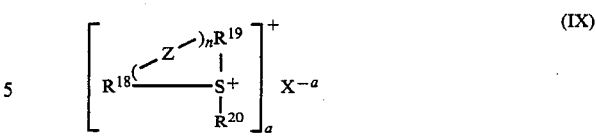

wherein $R^{18}$, $R^{19}$, and $R^{20}$ can be the same or different, provided that at least one of such groups is aromatic, and such groups can be selected from aromatic radicals having 4 to 20 carbon atoms (e.g., substituted and unsubstituted phenyl, thienyl, and furanyl) and alkyl radicals having 1 to 20 carbon atoms. The alkyl radicals include substituted alkyl radicals (for example, substitutents such as halogen, hydroxy, alkoxy, aryl. Z is selected from the group consisting of oxygen; sulfur; $>S=O$; $>C=O$;

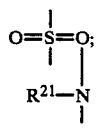

where $R^{21}$ is aryl or acyl (such as acetyl, benzoyl, etc.); a carbon-to-carbon bond; or

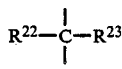

where $R^{22}$ and $R^{23}$ are selected from the group consisting of hydrogen, alkyl radicals having 1 to 4 carbon atoms, and alkenyl radicals having 2 to 4 carbon atoms; and n is zero or 1; X is an inorganic or organic anion; and a is the valence of X. Suitable representative anions include halide, e.g. chloride and bromide, sulfate, bisulfate, nitrate, hydroxide, perchlorate, trifluoromethane sulfonate, acetate, benzene sulfonate, tetrafluoroborate, hexachlorophosphate, hexafluorophosphate, hexachlorostannate, hexafluoroarsenate, hexafluoroantimonate, phenoxide and bisphenoxide.

A further component in the composition is an acid acceptor. Acid acceptors can be inorganic or organic compounds. Organic acid acceptors include sodium stearate, and magnesium oxalate. However, acid acceptors are generally inorganic bases and include magnesium oxide, lead oxide, calcium oxide, calcium hydroxide, dibasic lead phosphite, zinc oxide, barium carbonate, strontium hydroxide, calcium carbonate, etc. The preferred acid acceptors are magnesium oxide and calcium hydroxide. The acid acceptors can be used singly or in combination and preferably are used in amounts ranging from 2 to 25 parts per 100 parts by weight of the polymer.

Highly preferred compositions contain one or more diorgano sulfur oxide compounds. Said diorgano compounds, when compounded with the other ingredients in the composition can function to increase the cure rate of the composition. Said diorgano compounds are known in the art and are described, for example, in U.S. Pat. No. 4,287,320 (Kolb). Said compounds, briefly described, contain at least one sulfur atom, one or two oxygen atoms bonded only to each said sulfur, and, additionally, two neutral organic radicals which bond directly to the sulfur atoms by single C-S bonds, and have the general formula $(R^{24})_2SO_x$ wherein x is 1 or 2, and each $R^{24}$ is an organic radical. Each organic radical, $R^{24}$, may be the same or different and each radical may contain from one to twenty or more carbon atoms, although one to about eight carbon atoms are preferred, with a total of not more than about thirty carbon atoms associated with each sulfur atom. The two $R^{24}$ groups together may be a single alkylene group, forming with the sulfur atom a heterocyclic ring. The carbon skeletal chain of the $R^{24}$ groups may be linear, branched, or cyclic, may be aliphatic or aromatic, and may contain catenary hetero atoms, such as oxygen, in addition to carbon. Said chain may be substituted with, e.g., halide, alkoxy, —SOR, —SO$_2$R, carbalkoxy, oxo, hydroxyl, nitro, cyano, alkyl, aryl, or it may be unsubstituted. Such compounds include diorgano sulfoxides, $(R^{24})_2SO$, and diorgano sulfones, $(R^{24})_2SO_2$, and are described, for example in *Basic Principles of Organic Chemistry*, Roberts and Caserio, W. A. Benjamin Company, N.Y., N.Y., 1965, particularly pages 756–760, and *Organic Syntheses*, Vol. 1, pages 718–725, Vol. II, pages 1709–1715, Reinhold Publishing Co., N.Y., N.Y., 1957. Representative diorgano sulfur oxides include dimethylsulfone, tetramethylene sulfone, and bis(4-chlorophenyl) sulfone. Additional diorgano sulfur oxides are described in U.S. Pat. No. 4,287,320 (Kolb) which teachings are incorporated herein by reference.

Fillers are often added to the polymers discussed above to improve the molding characteristics and other properties. When a filler is employed it is added to the vulcanization recipe in amounts of up to about 100 parts per hundred parts by weight of rubber, preferably between about 15 and 50 parts per hundred parts by weight of the rubber. Examples of fillers which may be used are reinforcing thermal grade carbon blacks or non-black pigments of relatively low reinforcement characteristics such as clays, barytes, etc.

The organo-onium compound and polyhydroxy compound can be introduced to the curable copolymer in the form of finely divided solids by milling said compounds into the copolymer gum stock. Thus mixed, the gum stock can generally be stored at room temperature for extended periods, e.g., up to two years or more. Prior to curing, an acid acceptor is milled into the organo-onium-polyhydroxy-containing gum stock, after which the storage life of the stock is more limited. Of course, all of the components of the curing system may be admixed prior to their incorporation into the elastomer without departing from the scope of this invention. Another method of introducing the components of this invention into the curable copolymer can include making a complex of the metal salt, e.g., sodium, calcium, etc., of the polyhydroxy compound and organo-onium compound and adding said complex along with any additional, if desired, polyhydroxy compound to the unvulcanized copolymer. Said metal salt can be made by reacting the polyhydroxy compound with a base, e.g. sodium methoxide, in a suitable solvent, e.g. methanol. In some instances it may also be desirable to add one or more diorgano sulfur oxide compounds, and other conventional adjuvants or ingredients, e.g. retarding agents, processing aids, reinforcing agents, and fillers, to the gum stock.

The relative amounts of said polyhydroxy and organo-onium compounds are present in the composition in such amounts as to provide the desired cure of the composition when mixed with acid acceptor. Representative proportions of components of the curing system are set forth below in Table I. All amounts referred to therein are in parts per 100 parts by weight rubber abbreviated "phr" or in millimoles per hundred parts rubber abbreviated "mmhr", unless otherwise indicated, the "rubber" means the elastomer copolymer or gum. These proportions are general ranges and the particular amount for each particular cure time and temperature will become apparent to those skilled in the art.

TABLE I

| Formulation Ranges | |
|---|---|
| Component | Amounts |
| Acid acceptor | 0.5 to 40 phr |
| Organo-onium compound | 0.2 to 10 mmhr |
| Polyhydroxy compound | 0.3 to 10 mmhr |

Preferred compositions contain diorgano sulfur oxide compound most preferably tetramethylene sulfone, in a concentration range of 0.01 to 5 phr. Useful elastomers are obtained within the aforementioned formulation limits, although elastomeric products having particularly desired properties may be obtained by varying the relative amounts of the components within the specified ranges. Preferably, compositions comprise 2.3 to 3.0 mmhr organo-onium compound and 3.5 to 6.0 mmhr polyhydroxy compound.

Most preferably, said organo-onium compound and said polyhydroxy compound are introduced to the composition in the form of a complex, derived from said organo-onium compound and said polyhydroxy compound. Said complex is generally prepared by combining in reactive admixture equimolar amounts of sodium methoxide and polyhydroxy compound in a suitable solvent (e.g., methanol) to form the monosodium salt of the polyhydroxy compound. The resulting mixture is then reacted with an equimolar quantity of organo-onium compound to form a complex of the polyhydroxy compound and organo-onium compound.

In accordance with this invention, the desired amount of acid acceptor, organo-onium compound and polyhydroxy compound, diorgano sulfur oxide compounds, if any, and other conventional adjuvants or ingredients are added to the unvulcanized copolymer (i.e., gum stock) and intimately admixed therewith or compounded by employing any of the usual rubber mixing devices such as Banbury mixers, roll mills, or any other convenient mixing device.

For best results the temperature of the mixture on the mill should not rise above about 120° C. During milling it is necessary to distribute the components and adjuvants uniformly throughout the curable polymer. The curing process typically comprises extrusion or pressing the compounded mixture in a mold e.g., a cavity or a transfer mold, and subsequent oven curing. Pressing of the compounded mixture (press cure) is conducted at a temperature between about 95° C. and about 230° C., preferably between about 150° C. and about 205° C. for a period of from 1 minute to about 15 hours, usually from 5 minutes to 30 minutes. A pressure of between about 700 kPa and about 20,600 kPa, preferably between about 3,400 kPa and about 6,800 kPa is imposed on the compounded mixture in the mold. The molds first may be coated with a release agent, such as a silicone oil, and prebaked. The molded vulcanizate is then usually post cured (oven cured) at a temperature between about 150° C. and about 315° C., usually at about 232° C. for a period of from about 2 hours to 50 hours or more depending on the cross-sectional thickness of the sample. For thick sections, the temperature during the post cure is usually raised gradually from the lower limit of the range to the desired maximum temperature selected. For thinner cross-sections, e.g., less than 5 mm, the vulcanizate or cured sheet section may be put into the oven at the desired maximum temperature. The maximum temperature used is preferably about 232° C. and is held at this value for about 4 hours or more.

One major utility of the vulcanized, highly fluorinated elastomers of this invention lies in their use as shaft seals in automotive applications, gaskets, O-rings and the like, for containing fluids under pressure at elevated temperatures, as, for example, in hydraulic systems in aircraft, or as components of reactors in the processing of chemicals.

The following examples are offered to aid in a better understanding of the present invention and are not to be unnecessarily construed as limiting the scope thereof.

EXAMPLES

In the examples, indicated results were obtained using the following test methods:

Mooney Viscosity ASTM D1646-81

Cure Rheology Tests were run on uncured, compounded admixture using the Oscillating Disk Rheometer (ODR) Model 100S Monsanto in accordance with ASTM D 2084-82 with a micro die, no preheat, an oscillator frequency of 100 cpm and a 3° arc. Minimum torque ($M_L$) and highest torque attained during specified period of time when no plateau or maximum torque is obtained ($M_H$) were reported. Also reported were $t_s0.2$ (time for torque to increase 0.2 N.m above $M_L$), t'50 [time for torque to reach $M_L+0.5$ ($M_H-M_L$)], and t'90 [time for torque to reach $M_L+0.9(M_H-M_L)$].

Press Cure Unless otherwise noted, 150×150×1.8 mm sheets were prepared for physical property determination by pressing at about $6.9\times10^3$ kPa for 15 min. at 177° C.

Post Cure Samples were removed from the press and placed in a circulating air oven. The oven was maintained at 230° C. for 16 hours.

| Tensile Strength at Break | ASTM D 412-75 on a sample |
| Elongation at Break | cut from 1.8 mm sheet with |
| Modulus at 100% Elongation | ASTM Die D. |

Hardness ASTM D 2240-85 Method A. Type A-2 shore Durometer was used.

Mooney Scorch Tests were run on uncured, compounded formulations using a Scott Testing Inc. Mooney Viscometer Model ST1, in accordance with ASTM D1646-81 with a 1 minute preheat and a small rotor at 121° C. In the following examples, the fluoroelastomer gums listed in Table II were used.

TABLE II

| Fluoro-elastomer gum | Mooney viscosity | Composition (mole %) | | |
|---|---|---|---|---|
| | | $CF_2=CH_2$ | $CF_2=CF_2$ | $CH_3CH=CH_2$ |
| A | 51 @ 121° C. | 32 | 41 | 27 |
| B | 74 @ 150° C. | 36 | 45 | 19 |
| C | 41 @ 121° C. | 36 | 42 | 22 |
| D | 62 @ 121° C. | 30 | 42 | 28 |

Said fluoroelastomer gums were prepared according to the method described in U.S. Pat. No. 3,859,259 (Harrell et al.), and Japanese Kokoku Pat. No. Sho 38[1963]-21239.

The organo-onium accelerators were either obtained from commercial sources or made according to known methods. Tetraphenylphosphonium chloride and tetrabutylphosphonium chloride were obtained from Aldrich Chemical Company. 8-Benzyl-1,8-diazobicyclo[5.4.0]7undecenium chloride was made according to the procedure described in U.S. Pat. No. 3,857,807,benzyltris(dimethylamino)phosphonium chloride was made according to the procedure cited in U.S. Pat. Nos. 4,259,463 (Moggi et al.), i.e. 2,703,814, (Dye). Tetrabutylphosphonium chloride, tributylbenzylphosphonium chloride, dibutyldiphenylphosphonium chloride, were made according to procedures described in references cited in U.S. Pat. No. 3,876,654 (Pattison). Tributyl(2-methoxy)propylphosphonium is prepared by reacting tributylphosphine and allylchloride in methanol at 60° to 80° C. for 6 to 8 hours. Ammonium compounds were obtained from Aldrich Chemical Company. Sulfonium compounds were made using known methods cited in U.S. Pat. Nos. 4,233,421 (Worm), i.e. 2,807,648 (Pitt), G. H. Wiegard, et al., "Synthesis and Reactions of Triarylsulfonium Halides", *J. Org. Chem.* 33, 2671-75 (1968), K. Ohkubo et al., *J. Org. Chem.* 36 3149-55 (1971) and U.S. Pat. No. 4,120,866 (Winkler). Bis(benzyldiphenyl phosphine) iminium chloride was made according to the procedure described in European Patent Application No. 0182299A2.

EXAMPLES 1-15

The following examples illustrate the use of organo-onium vulcanization accelerators in the invention. The ingredients used in each composition were compounded on a two roll mill using standard methods. The organo-onium vulcanization accelerators are available commercially from the sources noted above or were prepared according to known methods described above. The polyhydroxy crosslinking agent, bisphenol AF, calcium hydroxide and tetramethylenesulfone (TMS) are commercially available. Magnesium oxide is available as Maglite D ™, and carbon black is available as Thermax MT ™, ASTM N990.

The compounded gumstocks were evaluated for cure rheology characteristics in accordance with the methods described above, and in some runs, samples were press cured and post cured and post cure physical properties were obtained. The compositions of the compounded gums, cure rheology characteristics and post cure physical properties are summarized in Tables III through VI. As these tables show, the compositions used in Examples 1-14 had acceptable cure rates and produced acceptable final cure states as measured by the difference, $M_H-M_L$. The tables also show Examples 10-13 obtained acceptable post cure physical properties.

TABLE III

| | Examples | | | | |
|---|---|---|---|---|---|
| | 1 | 2 | 3 | 4 | 5 |
| Fluoroelastomer A | 100 | 100 | 100 | 100 | 100 |
| Carbon black (phr) | 30 | 30 | 30 | 30 | 30 |
| Ca(OH)$_2$ (phr) | 6 | 8 | 8 | 8 | 6 |
| MgO (phr) | 3 | 3 | 3 | 3 | 3 |
| TMS (phr) | | 1 | 1 | 1 | |
| Bisphenol AF (mhr × 10$^3$) | 6.25 | 6.25 | 6.25 | 6.25 | 6.25 |
| Benzyltris (dimethylamino) | 4 | | | | |

TABLE III-continued

| | Examples | | | | |
|---|---|---|---|---|---|
| | 1 | 2 | 3 | 4 | 5 |
| phosphonium chloride (mhr × 10³) | | | | | |
| Tributylbenzyl phosphonium chloride (mhr × 10³) | | 4 | | | |
| Dibutyldiphenyl phosphonium chloride (mhr × 10³) | | | 4 | | |
| Tetraphenyl-phosphonium chloride (mhr × 10³) | | | | 4 | |
| Bis(benzyldiphenyl phosphine)iminium chloride | | | | | 4 |
| Cure rheology | | | | | |
| $M_L$ (N.m) | 1.69 | 1.81 | 1.81 | 1.86 | 1.86 |
| $M_H$ (N.m) | 6.67 | 9.77 | 9.83 | 7.85 | 6.72 |
| Min to $M_H$ | 12 | 12 | 12 | 12 | 12 |
| $t_S$ 0.2 | 3.3 | 3.6 | 2.2 | 2.3 | 5.35 |
| t'50 | 4.3 | 7.0 | 3.6 | 3.6 | 7.2 |
| t'90 | 5.4 | 8.5 | 6.6 | 4.95 | 9.4 |

TABLE IV

| | Examples | | | |
|---|---|---|---|---|
| COMPOSITION | 6 | 7 | 8 | 9 |
| Fluoroelastomer A | 100 | 100 | 100 | 100 |
| Carbon black (phr) | 30 | 30 | 30 | 30 |
| Ca(OH)₂ (phr) | 8 | 8 | 8 | 8 |
| MgO (phr) | 3 | 3 | 3 | 3 |
| TMS (phr) | 1 | 1 | 1 | 1 |
| Bisphenol AF (mhr × 10³) | 6.25 | 6.25 | 6.25 | 6.25 |
| 8-Benzyl-1,8,diazobicyclo [5.4.0]7-undecenium chloride (mhr × 10³) | 8 | | | |
| Tetrabutylammonium bromide (mhr × 10³) | | 4 | | |
| Tetrahexylammonium chloride (mhr × 10³) | | | 4 | |
| Tetraheptylammonium chloride (mhr × 10³) | | | | 4 |
| Cure rheology | | | | |
| $M_L$ (N.m) | 2.26 | 1.92 | 1.81 | 1.67 |
| $M_H$ (N.m) | 5.98 | 5.20 | 7.91 | 7.03 |
| Min to $M_H$ | 12 | 12 | 12 | 12 |
| $t_S$ 0.2 | 1.3 | 3.0 | 2.4 | 5.6 |
| t'(50) | 3.4 | 4.0 | 3.5 | 9.4 |
| t'(90) | 7.7 | 6.2 | 5.7 | 10.6 |

TABLE V

| | EXAMPLES | | | |
|---|---|---|---|---|
| COMPOSITION | 10 | 11 | 12 | 13 |
| Fluoroelastomer A | 100 | 100 | 100 | 100 |
| Carbon black (phr) | 30 | 30 | 30 | 30 |
| Ca(OH)₂ (phr) | 8 | 8 | 8 | 8 |
| MgO (phr) | 3 | 3 | 3 | 3 |
| TMS (phr) | 1 | 1 | 1 | 1 |
| Bisphenol AF (mhr × 10³) | 6.25 | 6.25 | 6.25 | 6.25 |
| Tributyl(2-methoxy) propylphosphonium chloride (mhr × 10³) | 2.5 | | | |
| Tetrabutylphosphonium chloride (mhr × 10³) | | 4 | | |
| Tetrapentylammonium chloride (mhr × 10³) | | | 4 | |
| Tetrabutylammonium chloride (mhr × 10³) | | | | 4 |
| Cure rheology | | | | |
| $M_L$ (N.m) | 1.86 | 2.03 | 1.81 | 1.94 |
| $M_H$ (N.m) | 8.47 | 8.47 | 7.89 | 6.47 |
| Min to $M_H$ | 12 | 12 | 12 | 12 |
| $t_S$ 0.2 | 3.3 | 1.8 | 2.2 | 2.05 |
| t'(50) | 4.4 | 2.6 | 3.3 | 2.9 |
| t'(90) | 6.4 | 3.5 | 5.6 | 3.9 |
| Post Cure, 16 Hr at 232° C. | | | | |
| Tensile (MPa) | 17.32 | 13.45 | 13.12 | 15.10 |
| 100% Modulus (MPa) | 7.03 | 10.58 | 9.06 | 9.02 |
| Elongation at Break (%) | 189 | 126 | 145 | 156 |
| Hardness (Shore A₂) | 77 | 86 | 85 | 83 |

TABLE VI

| | EXAMPLES | |
|---|---|---|
| COMPOSITION | 14 | 15 |
| Fluoroelastomer A | 100 | 100 |
| Carbon black (phr) | 30 | 30 |
| Ca(OH)₂ (phr) | 8 | 8 |
| MgO (phr) | 3 | 3 |
| TMS (phr) | 1 | 1 |
| Bisphenol AF (mhr × 10³) | 6.25 | 6.25 |
| Triphenylsulfonium chloride (mhr × 10³) | 4 | |
| Tritolylsulfonium chloride (mhr × 10³) | | 4 |
| Cure rheology | | |
| $M_L$ (N.m) | 2.1 | 1.69 |
| $M_H$ (N.m) | 3.05 | 7.23 |
| Min to $M_H$ | 24 | 12 |
| $t_S$ 0.2 | 7.9 | 4.8 |
| t'(50) | 9.4 | 6.25 |
| t'(90) | 12 | 8.1 |

EXAMPLES 16–19 and COMPARATIVE EXAMPLES A, B, and C

The following examples illustrate the effectiveness of some of the various types of polyhydroxy crosslinking agents included in this invention. Examples 16–19 were compounded in the same manner described in Examples 1–15 except that various polyhydroxy crosslinking agents were substituted for bisphenol AF. 4,4'-Thiodiphenol and bisphenol A were obtained from Aldrich Chemical Company. 1,1,6,6,-Tetrahydrooctafluorohexanediol is available commercially. Comparative Examples A–C were compounded in the same manner described in Examples 1–15 except that in all of the compositions bisphenol A was substituted for bisphenol AF, in Comparative Example A the organo-onium compound was left out of the composition, in Comparative Example B the polyhydroxy crosslinking agent was left out of the composition, and in Comparative Example C the organo-onium compound was left out of the composition and a polyether diol available as Carbowax ™ 400 was added to the composition. The ingredients, amounts of ingredients used, and the cure rheology characteristics are summarized in Tables VII and VIII.

The tables show that the compositions used in Examples 16–19 obtained acceptable cure rates and final cure states as measured by the difference, $M_H-M_L$. However the compositions used in Comparative Examples A–C, which did not include both an organo-onium compound and a polyhydroxy crosslinking agent did not cure. This illustrates the synergistic effect of the components of this invention.

TABLE VII

| | EXAMPLES | | | |
|---|---|---|---|---|
| COMPOSITION | 16 | 17 | 18 | 19 |
| Fluoroelastomer A | 100 | 100 | 100 | 100 |
| Carbon black (phr) | 30 | 30 | 30 | 30 |
| Ca(OH)₂ (phr) | 8 | 6 | 6 | 6 |

TABLE VII-continued

| COMPOSITION | EXAMPLES | | | |
|---|---|---|---|---|
| | 16 | 17 | 18 | 19 |
| MgO (phr) | 3 | 3 | 3 | 3 |
| TMS (phr) | 1 | | | |
| Tributyl(2-methoxy)propylphosphonium chloride (mhr × $10^3$) | 2.5 | 2.5 | 2.5 | 4.0 |
| Bisphenol AF (mhr × $10^3$) | 6.25 | | | |
| Bisphenol A (mhr × $10^3$) | | 6.25 | | |
| 4,4'-Thiodiphenol (mhr × $10^3$) | | | 6.25 | |
| 1,1,6,6-Tetrahydrooctafluorohexanediol (mhr × $10^3$) | | | | 12.50 |
| Cure rheology | | | | |
| $M_L$ (N.m) | 1.86 | 1.72 | 1.92 | 2.09 |
| $M_H$ (N.m) | 8.47 | 7.57 | 5.42 | 9.04 |
| Min to $M_H$ | 12 | 12 | 12 | 12 |
| $t_S$ 0.2 | 3.3 | 2.5 | 5.2 | 1.9 |
| $t'(50)$ | 4.35 | 3.8 | 7.3 | 2.45 |
| $t'(90)$ | 6.40 | 6.0 | 9.7 | 6.3 |

TABLE VIII

| COMPOSITION | COMPARATIVE EXAMPLE | | |
|---|---|---|---|
| | A | B | C |
| Fluoroelastomer A | 100 | 100 | 100 |
| Carbon black (phr) | 30 | 30 | 30 |
| Ca(OH)$_2$ (phr) | 6 | 6 | 6 |
| MgO (phr) | 3 | 3 | 3 |
| Bisphenol A (mhr × $10^3$) | 6.25 | | 6.25 |
| Tributyl(2-methoxy)-propylphosphonium chloride (mhr × $10^3$) | | 4 | |
| Carbowax 400 (mhr × $10^3$) (a polyether diol) | | | 5 |
| Cure rheology | | | |
| $M_L$ (N.m) | 1.92 | 2.37 | 1.81 |
| $M_H$ (N.m) | 1.92 | 2.48 | 2.14 |
| Min to $M_H$ | no cure | no cure | no cure |
| $t_S$ 0.2 | — | — | — |
| $t'(50)$ | — | — | — |
| $t'(90)$ | — | — | — |

EXAMPLES 20-22

The following examples illustrate the effectiveness of various copolymer compositions on cure rate and final cure state. The compositions were compounded as described in Examples 1-15, except that a different copolymer composition was used in each example. The copolymers used were the same as those described above and their compositions and properties are summarized in Table II. The ingredients used and the cure rheology characteristics are summarized in Table IX. The table shows that all compositions obtained good cure rates and final cure states.

TABLE IX

| COMPOSITION | EXAMPLES | | |
|---|---|---|---|
| | 20 | 21 | 22 |
| Fluoroelastomer A | 100 | | |
| Fluoroelastomer B | | 100 | |
| Fluoroelastomer C | | | 100 |
| Carbon black (phr) | 30 | 30 | 30 |
| Ca(OH)$_2$ (phr) | 8 | 6 | 6 |
| MgO (phr) | 3 | 3 | 3 |
| Bisphenol AF (mhr × $10^3$) | 6.25 | 6.25 | 6.25 |
| Tributyl(2-methoxy)propylphosphonium chloride (mhr × $10^3$) | 4 | 4 | 4 |
| Cure rheology | | | |
| $M_L$ (N.m) | 1.75 | 3.27 | .66 |
| $M_H$ (N.m) | 8.98 | 10.17 | 5.20 |
| Min to $M_H$ | 12 | 12 | 12 |

TABLE IX-continued

| COMPOSITION | EXAMPLES | | |
|---|---|---|---|
| | 20 | 21 | 22 |
| $t_S$ 0.2 | 2.45 | 2.1 | 3.2 |
| $t'(50)$ | 3.85 | 3.7 | 4.1 |
| $t'(90)$ | 5.80 | 5.4 | 6.3 |

EXAMPLES 22-26

The following examples illustrate the effect addition of one or more diorgano sulfur oxide compounds can have on cure rate. The compositions were compounded in the same manner as Examples 1-15 except that dimethylsulfone (DMS) and blends of DMS and TMS were added to the composition, and a Tributyl(2-methoxy)propylphosphonium bisphenol AF complex (i.e. Tributyl(2-methoxy)propylphosphonium bisphenoxide AF) was added to the gum instead of the uncomplexed accelerator. Said complex was prepared by reacting equimolar amounts of sodium methoxide and bisphenol AF in methanol to form the monosodium salt of bisphenol AF. This monosodium salt was then reacted with an equimolar amount of Tributyl(2-methoxy)propylphosphonium chloride. Sodium chloride formed and precipitated out of solution while the bisphenol-organo-onium complex remained in solution. Cure rheology characteristics were determined for all compositions and Mooney scorch values were determined for Example 24. The ingredients used in the compositions, the cure rheology characteristics, and Mooney scorch values are summarized in Table X As the table shows, Examples 22 and 23 containing TMS had significantly shorter $t'(90)$ values than Example 21, a similar formulation lacking TMS, and Example 24 containing DMS and had a significantly shorter $t'(90)$ than Example 21. The table also shows, in Example 25, that a blend of TMS and DMS is also effective in reducing $t'(90)$. The Mooney scorch values from Example 24 indicated that the composition did not undergo an increase in the viscosity when heated below its cure temperature, i.e., the composition had low scorch.

TABLE XI

| COMPOSITION | EXAMPLES | | | | |
|---|---|---|---|---|---|
| | 22 | 23 | 24 | 25 | 26 |
| Fluoroelastomer D | 100 | 100 | 100 | 100 | 100 |
| Carbon black (phr) | 30 | 30 | 30 | 30 | 30 |
| Ca(OH)$_2$ (phr) | 6 | 6 | 6 | 6 | 6 |
| MgO (phr) | 3 | 3 | 3 | 3 | 3 |
| Bisphenol AF (mhr × $10^3$) | 3.75 | 3.75 | 3.75 | 3.75 | 3.75 |
| Tributyl(2-methoxy)-propylphosphonium-bisphenoxide AF (mhr × $10^3$) | 2.5 | 2.5 | 2.5 | 2.5 | 2.5 |
| TMS (phr) | | 0.5 | 1.0 | | 0.5 |
| DMS (phr) | | | | 1.0 | 0.5 |
| Cure rheology | | | | | |
| $M_L$ (N.m) | 1.69 | 1.59 | 1.46 | 1.46 | 1.41 |
| $M_H$ (N.m) | 9.04 | 9.49 | 9.26 | 9.49 | 9.60 |
| Min to $M_H$ | 12 | 12 | 12 | 12 | 12 |
| $t_S$ 0.2 | 7.8 | 5.4 | 4.5 | 3.8 | 3.2 |
| $t'50$ | 10.2 | 7.55 | 6.75 | 5.25 | 4.4 |
| $t'90$ | 11.5 | 8.4 | 7.75 | 6.1 | 5.5 |
| Mooney Scorch (MS + 1 @ 121° C.) | | | | | |
| Minimum torque (N.m) | | | 3.15 | | |
| N.m rise in 25 min. | | | 0.17 | | |

Various modifications and alterations of this invention will become apparent to those skilled in the art without departing from the scope and spirit of this invention.

What is claimed is:

1. An elastomeric composition comprising saturated elastomer gum consisting essentially of repeating interpolymerized units derived from vinylidene fluoride, tetrafluoroethylene, and copolymerizable hydrocarbon olefin, and the combination of
   (A) 0.3 to 10 millimoles of polyhydroxy compound per one hundred grams of said gum, and
   (B) 0.2 to 10 millimoles of organo-onium compound per one hundred grams of said gum, except when said gum is derived from vinylidene fluoride, tetrafluoroethylene and propylene, and said polyhydroxy compound is hexafluoroisopropylidene-bis-(4-hydroxybenzene), and said organo-onium is a phosphonium compound, then said organo-onium compound is other than benzyltriphenylphosphonium chloride.

2. The composition of claim 1 wherein said organo-onium compound is selected from the group consisting of quaternary organo-onium compounds and sulfonium compounds.

3. The composition of claim 2 wherein said quaternary organo-onium compound is selected from the group consisting of ammonium, arsonium, stibonium, phosphonium, amino-phosphonium, phosphorane, and iminium compounds.

4. The composition of claim 1 further comprising diorgano sulfur oxide compound.

5. The composition of claim 4 wherein said diorgano sulfur oxide compound is present at a level of 0.01-5 phr.

6. The composition of claim 4 wherein said diorgano sulfur oxide compound is selected from the group consisting of diorgano sulfoxide or diorgano sulfone compounds.

7. The composition of claim 4 wherein said diorgano sulfur oxide compound is selected from the group consisting of dimethylsulfone, tetramethylenesulfone, or blends thereof.

8. The composition of claim 1 wherein said copolymer comprises about 2 to 90 mole percent vinylidene fluoride, 5-65 mole percent tetrafluoroethylene, and 5 to 45 mole percent hydrocarbon olefin.

9. The composition of claim 8 wherein said hydrocarbon olefin is propylene.

10. The composition of claim 8 wherein said copolymer comprises 2 to 65 mole percent vinylidene fluoride, 20 to 60 mole percent tetrafluroethylene, and 10 to 50 mole percent hydrocarbon olefin.

11. The composition of claim 10 wherein said hydrocarbon olefin is propylene.

12. The composition of claim 1 further comprising 0.5 to 40 phr of acid acceptor.

13. The composition of claim 1 wherein said polyhydroxy compound is an aromatic polyhydroxy compound.

14. The composition of claim 13 wherein said aromatic polyhydroxy compound has the general formula

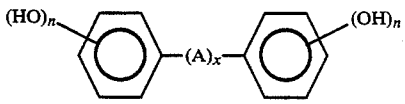

wherein A is selected from the group consisting of divalent aliphatic, cycloaliphatic, and aromatic radicals of 1 to 13 carbon atoms, thio, oxy, carbonyl, sulfinyl, and sulfonyl radicals, n is 1 or 2, and x is 0 or 1.

15. The composition of claim 14 wherein said aromatic polyhydroxy compound is isopropylidene-bis(4-hydroxybenzene) or hexafluoroisopropylidene-bis(4-hydroxybenzene).

16. The composition of claim 3 wherein said ammonium, phosphonium, stibonium, and arsonium compounds have the formula

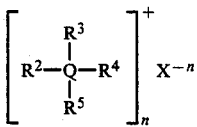

where Q is selected from the group consisting of nitrogen, phosphorous, arsenic, and antimony, X is an anion, n is equal to the valence of the anion X, and $R^2$, $R^3$, $R^4$, and $R^5$ are selected from the group of radicals consisting of alkyl, aryl, alkenyl, or combinations thereof, and any pair of said R groups can be connected with each other and the Q atom to form a heterocyclic ring.

17. The composition of claim 16 wherein said X is selected from the group consisting of halide, sulfate, acetate, phosphate, phosphonate, hydroxide, alkoxide, phenoxide and bisphenoxide.

18. The composition of claim 16 wherein three of the groups $R^2$, $R^3$, $R^4$, and $R^5$ are butyl, the remaining R group is allyl or 2-methoxypropyl, Q is phosphorous, n is one, and X is bisphenoxide AF.

19. The composition of claim 16 wherein at least one of the groups $R^2$, $R^3$, $R^4$, or $R^5$ is selected from the group of radicals consisting of alkyl, or alkenyl radicals.

20. The composition of claim 3 wherein said amino-phosphonium compound is selected from the group consisting of compounds having the following formulas

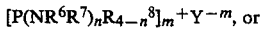

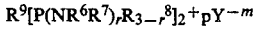

wherein N is nitrogen, P is phosphorous, $R^6$, $R^7$, and $R^8$ are selected from the group consisting of alkyl, cycloalkyl, aryl, aralkyl, oxyalkyl and poly(oxyalkyl) groups with a free or etherified terminal OH function, $R^9$ is selected from the group consisting of bivalent alkylene, arylene and oxoalkylene radicals, n is a whole number between 1 and 4, r is a whole number between 1 and 3, m is a whole number between 1 and 3, Y is an anion of valency m, p is a coefficient such that m times p is 2.

21. The composition of claim 20 wherein said Y is selected from the group consisting of halide, perchlorate, nitrate, tetrafluoroborate, hexafluorophosphate, oxalate, acetate, stearate, haloacetate, para-toluensulphonate, phenoxide, bisphenoxide, and hydroxy.

22. The composition of claim 3 wherein said phosphorane compound has the formula

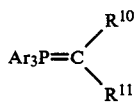

where Ar is aryl, and $R^{10}$ and $R^{11}$ are selected from the group consisting of (1) separate groups selected individually from (a) hydrogen, methyl, ethyl, propyl, and one to six carbon atom carbalkoxy in the case of $R^{10}$, and b) one to six carbon atom carbalkoxy cyano, and —CONH$_2$ in the case of $R^{10}$; and (2) a single group which together with the carbon atom to which the single group is attached from a cyclic group selected from

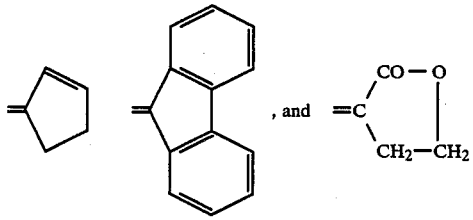

23. the composition of claim 3 wherein said iminium compound has the formula

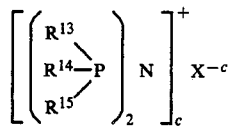

wherein $R^{13}$, $R^{14}$ and $R^{15}$ can be the same or different and can be selected from the group consisting of aryl, 1 to 20 carbon atom alkyl, 3 to 8 carbon atom cycloalkyl, 7 to 20 carbon aralkyl groups, X is an anion, and c is a number equal to the valence of X.

24. The composition of claim 2 wherein said sulfonium compound has the formula

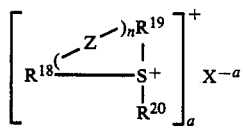

wherein $R^{18}$, $R^{19}$, and $R^{20}$ groups can be the same or different, at least one of said groups is aromatic, and said groups can be selected from the group consisting of aromatic radicals having 4 to 20 carbon atoms or alkyl radicals having 1 to 20 carbon atoms, Z is selected from the group consisting of oxygen, sulfur, $>S=O$, $>C=O$,

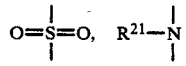

where $R^{21}$ is aryl or acyl, a carbon-to-carbon bond, and

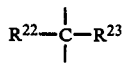

where $R^{22}$ and $R^{23}$ are selected from the group consisting of hydrogen, alkyl radicals having 1 to 4 carbon atoms, and alkenyl radicals having 2 to 4 carbon atoms, n is zero or 1, and X is an anion, and a is the valence of X.

25. The composition of claim 24 wherein X is selected from the group consisting of halide, sulfate, bisulfate, nitrate, hydroxide, perchlorate, trifluoromethane sulfonate, acetate, benzene sulfonate, tetrafluoroborate, hexachlorophosphate, hexafluorophosphate, hexachlorostannate, hexafluoroarsenate, hexafluoroantimonate, phenoxide and bisphenoxide.

26. The composition of claim 1 wherein said copolymer is a copolymer derived from 30 to 36 mole percent vinylidene fluoride, 41 to 45 mole percent tetrafluoroethylene, and 19 to 28 mole percent propylene, said polyhydroxy compound is hexafluoroisopropylidenebis(4-hydroxybenzene) and said organo-onium compound is tributyl(2-methoxy)propylphosphonium chloride.

27. The composition of claim 26 wherein said polyhydroxy compound is isopropylidene-bis(4-hydroxybenzene).

28. The composition of claim 27 further comprising tetramethylenesulfone.

29. The composition of claim 28 wherein said organoonium compound is selected from the group consisting of tritolylsulfonium chloride, tetrabutylphosphonium chloride, tetrabutylammonium chloride, tetrabutylammonium bromide, tributyl(2-methoxy)propylphosphonium chloride, tetrahexylammonium chloride, tetraheptylammonium chloride, 8-benzyl-1,8,diazobicyclo[5.4.0]7=undecenium chloride, tributylbenzylphosphonium chloride, dibutyldiphenylphosphonium chloride, tetraphenylphosphonium chloride, dibutyldiphenylphosphonium chloride, benzyltris(dimethylamino)phosphonium chloride, tetrapentylammonium chloride, tetrapentylammonium chloride, and bis(benzyldiphenylphosphine)iminium chloride.

* * * * *

UNITED STATES PATENT AND TRADEMARK OFFICE
CERTIFICATE OF CORRECTION

PATENT NO. : 4,882,390
DATED : November 21, 1989
INVENTOR(S) : Werner M. A. Grootaert et al.

It is certified that error appears in the above-identified patent and that said Letters Patent is hereby corrected as shown below:

Col. 1, line 55, "Schmieqel" should read --Schmiegel--.

Col. 1, line 68, "(Hisasue R et al)" should read --(Hisasue et al)--.

Col. 2, line 49, "oomponent" should read --component--.

Col. 4, line 24, "conjugated" should be --conjugate--.

Col. 5, line 23, delete "olefin,".

Col. 5, line 50, "$[P(NR^6R^7)_nR_{4-n}^8]_m+Y^{-m}$" should be --$[P(NR^6R^7)_nR^8_{4-n}]_m+Y^{-m}$--.

Col. 5, line 64, "oxoalkylene" should read --oxyalkylene--.

Col. 6, line 27, "known groups," should read --known aryl groups,--.

Col. 6, line 31, after carbalkoxy ($C_1$-$C_6$alkyl) insert a --,--.

Col. 6, lines 38-46, after " 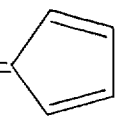 '" insert a --,--.

Col. 7, line 1, after "120462A1" insert a --,--.

UNITED STATES PATENT AND TRADEMARK OFFICE
CERTIFICATE OF CORRECTION

PATENT NO. : 4,882,390

DATED : November 21, 1989

INVENTOR(S) : Werner M. A. Grootaert et al.

It is certified that error appears in the above-identified patent and that said Letters Patent is hereby corrected as shown below:

Col. 8, line 19, " 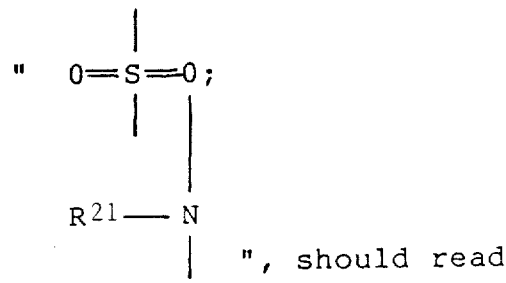 ", should read

-- 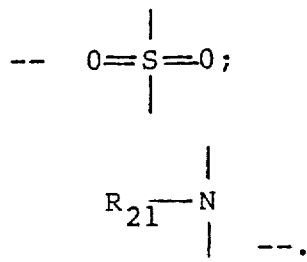 --.

Col. 16, line 32, after "Table X" insert a --.--.

Col. 17, line 57, "tetrafluroethylene," should read --tetrafluoroethylene--.

UNITED STATES PATENT AND TRADEMARK OFFICE
CERTIFICATE OF CORRECTION

PATENT NO. : 4,882,390

DATED : November 21, 1989

INVENTOR(S) : Werner M. A. Grootaert et al

It is certified that error appears in the above-identified patent and that said Letters Patent is hereby corrected as shown below:

Col. 18, line 48, "$[P(NR^6R^7)_aR_{4-a}^8]_m+Y^{-m}$" should be
--$[P(NR^6R^7)_aR^8_{4-a}]_m+Y^{-m}$--.

Col. 18, line 50, "$R^9[P(NR^6R^7)_rR_{3-r}^8]_2+pY^{-m}$" should be
--$R^9[P(NR^6R^7)_rR^8_{3-r}]_2+pY^{-m}$--.

Col. 18, line 57, "oxoalkylene" should read --oxyalkylene--.

Col. 19, line 12, after "carbalkoxy" insert --,--.

Col. 19, line 41, after "7 to 20 carbon" insert --atom--.

Col. 19, lines 17-25, after " 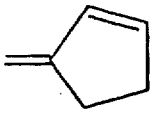 " insert --,--.

Col. 19, lines. 17-25, " 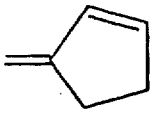 " should be -- ·  --.

Signed and Sealed this

Fourteenth Day of July, 1992

Attest:

DOUGLAS B. COMER

Attesting Officer

Acting Commissioner of Patents and Trademarks